Patented July 22, 1947

2,424,386

UNITED STATES PATENT OFFICE 2,424,386

METHOD OF COATING TEXTILE FABRIC WITH POLYVINYL RESIN

Rudolph Herbert Czeczowitzka, Pendleton, Salford, England, assignor to Texproof Limited, Pendleton, Salford, England, a British company No Drawing. Application June 11, 1943, Serial No. 490,482. In Great Britain June 19, 1942

1 Claim. (Cl. 117—47)

This invention relates to the coating of permeable materials, such as textile fabrics, with compositions which are adapted to yield a surface film or coating and has for its object to provide an improved process for effecting such coating which will be economical in the coating composition, and will produce a coated fabric of better pliability and improved appearance and with a more uniform coating than is at present usually obtainable.

In accordance with my invention, the permeable material prior to the coating operation is impregnated with a volatile liquid body which is capable of forming an emulsion with the coating composition and of producing an emulsified layer at the surface of the material. The emulsified layer is dried along with the coating by evaporation after the coating operation has been completed. If desired, I may impregnate the permeable material with the volatile liquid before some or each of a plurality of coating operations. With my improvement, I prevent the coating composition from impregnating or permeating the permeable material and so reducing or destroying its pliability, in addition to causing loss of the composition and spoiling the appearance of the permeable material.

The impregnating liquid may consist of a single volatile body or a mixture of several volatile liquids and may contain small quantities of substances modifying the viscosity and wetting power of the liquid. Small additions of a precipitant for the coating composition may also be made. The solid residue caused by these additions can either be left in the coated material or may be removed in a final washing operation.

The impregnation may be effected by immersion, and any excess of liquor be removed by squeezing or mangling. The coating can be effected in any usual way such as by spreading, brushing, dipping, printing or spraying. The coating can be applied to one or both sides.

Possible combinations of impregnating liquids and coating solutions can be grouped as follows:

A. Impregnating liquids which are miscible or soluble in the coating solution.

B. Liquids precipitating or gelling the film-forming material.

C. Liquids capable of forming an emulsion with the coating solution.

It is self-evident that groups A and B cannot form emulsions. Liquids of group A will simply result in a dilution of the coating compound, and thus facilitate penetration of the permeable material, whereas liquids of group B clot and repel the film-forming material, resulting in coatings which do not sufficiently adhere to the fabric. The present invention consists in the discovery that liquids of group C are capable of preventing penetration or permeation through the permeable material, whilst at the same time a satisfactory bond is produced between the permeable material and the coating.

The production of the emulsion at the surface of the fabric or material may be assisted by the formation at such surface of for example ammonium stearate, ammonium oleate or triethanolamine oleate. In producing ammonium stearate for example we may add 0.5% of stearic acid to the coating solution and 1% of a 0.88 ammonia solution to the impregnating liquid. The latter may also contain a thickener and a wetting out agent for example, the sodium salt of an alkylaryl sulphonic acid and have the following approximate composition:

| | Per cent by weight |
|---|---|
| Water | 97.5 |
| Calcium alginate | 0.5 |
| Sodium carbonate | 0.75 |
| Alkylaryl sodium sulfonate | 0.25 |
| 0.88 ammonia solution | 1.0 |

The coating composition is applied to the fabric or material during several passages through the spreading machine, the fabric or material passing over a drying chest or the like after each application of the coating compoistion. During the application of the preliminary, say three, coatings, the spreader blade may be kept clear of the spreading roller but during the later applications such blade may come against the roller to make possible more accurate adjustment of the spreading operation. After a few, say three, coatings have been applied, the fabric may have obtained a sufficient surface coating to prevent any subsequent coatings penetrating the cloth so that such subsequent coatings may be applied in a normal manner.

For the preliminary coatings, say three, the following approximate composition may be employed:

| | Per cent by weight |
|---|---|
| Ethyl acetate | 70.0 |
| Butyl acetate | 11.5 |
| Vinyl resin[1] | 11.0 |
| Tricresyl phosphate | 4.0 |
| Dibutyl phthalate | 2.7 |
| Castor oil | 0.3 |
| Stearic acid | 0.5 |
| | 100.0 |

[1] The vinyl resin comprises either polyvinyl acetate, vinyl-chloride-acetate copolymer or polyvinyl butyral.

For the final or finishing coats, which may be for example three in number, the following approximate composition may be employed.

| | Per cent by weight |
|---|---|
| Butyl acetate | 62.0 |
| Ethyl acetate | 13.0 |
| Vinyl resin[1] | 11.0 |
| Tricresyl phosphate | 7.0 |
| Castor oil | 0.55 |
| China clay | 2.5 |
| Lithopone | 2.0 |
| Titanium dioxide | 1.2 |
| Antimony red | 0.35 |
| Green pigment | 0.13 |
| Chrome yellow | 0.25 |
| Carbon black | 0.02 |
| | 100.0 |

[1] The vinyl resin comprises either polyvinyl acetate, vinyl-chloride-acetate copolymer or polyvinyl butyral.

If desired when using the above preliminary coating composition, the fabric may be passed through the impregnating liquid once only prior to the first application of the coating.

It will be appreciated that the impregnating and coating operations may be carried out in a single machine as a continuous process, but in some cases the two operations may be carried out separately at different times.

It will also be appreciated that the character and composition of the fabric or material being treated will have to be taken into account in determining the consistency of the impregnating liquid in order to ensure proper impregnation.

With my improvement, very thin solutions repeatedly applied may be used in producing coatings, which ensures uniformity of coating and absolute impermeability.

What I claim is:

A method of forming a surface coating of a polyvinyl resin on a textile fabric, comprising impregnating the fabric with water containing small quantities of calcium alginate, ammonia and a wetting agent, applying to the fabric a coating of a solution, in an organic solvent of a plasticized polyvinyl resin selected from the group consisting of polyvinyl acetate, vinyl chloride-acetate copolymers and polyvinyl acetals, and stearic acid, applying to the fabric a coating of a solution containing a filler and a plasticized polyvinyl resin as defined above, and drying the fabric.

RUDOLPH HERBERT CZECZOWITZKA.

REFERENCES CITED

The following references are of record in the file of this patent:

UNITED STATES PATENTS

| Number | Name | Date |
|---|---|---|
| 2,130,530 | Fletcher | Sept. 20, 1938 |
| 2,142,986 | Arnold | Jan. 10, 1939 |
| 2,317,779 | Janser | Apr. 27, 1943 |
| 2,108,806 | Finzel | Feb. 22, 1938 |
| 1,996,079 | Murphy | Apr. 2, 1939 |
| 1,277,695 | Cavanaugh | Sept. 3, 1918 |
| 2,311,488 | Thomas | Feb. 16, 1943 |